Patented Mar. 3, 1953

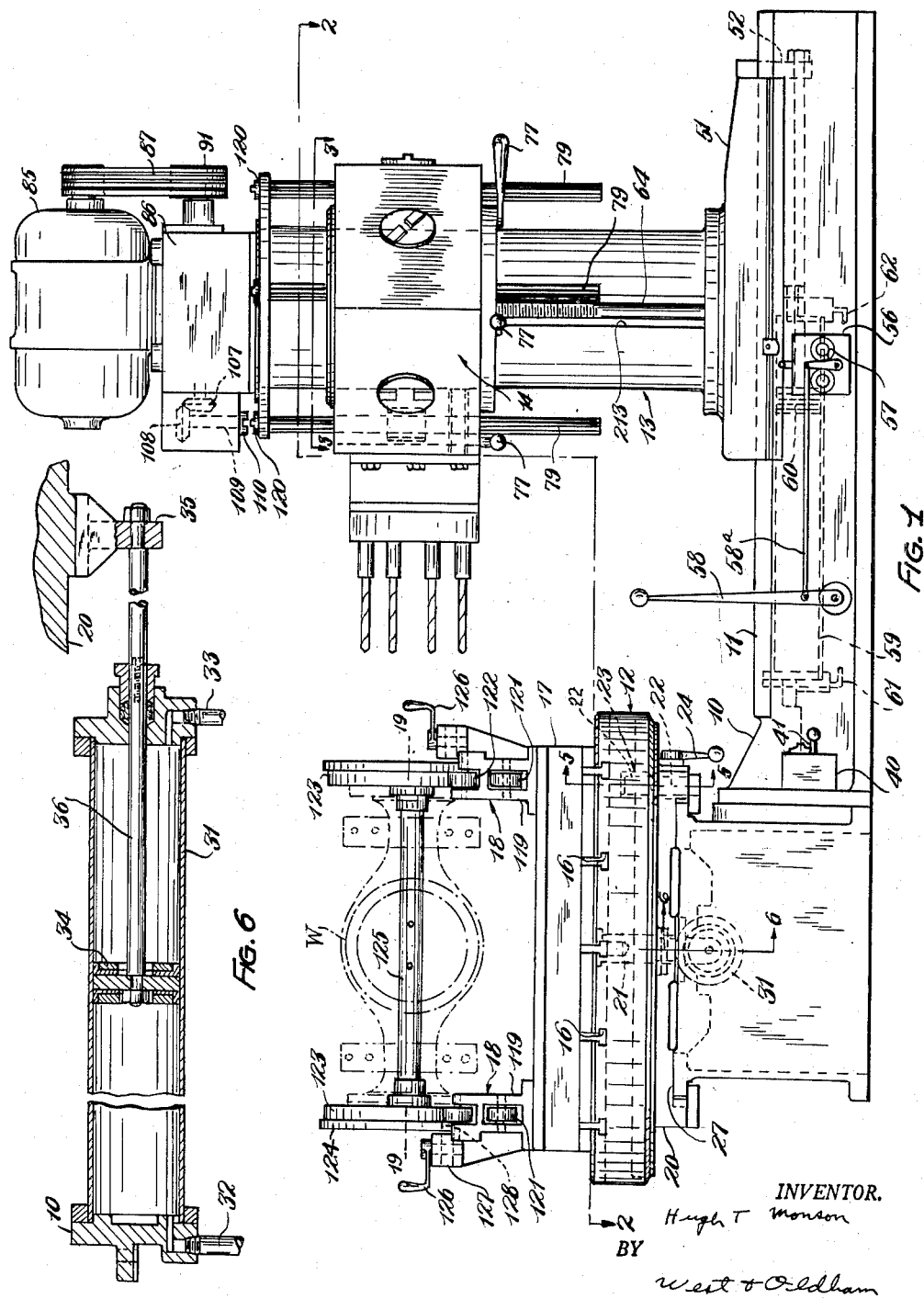

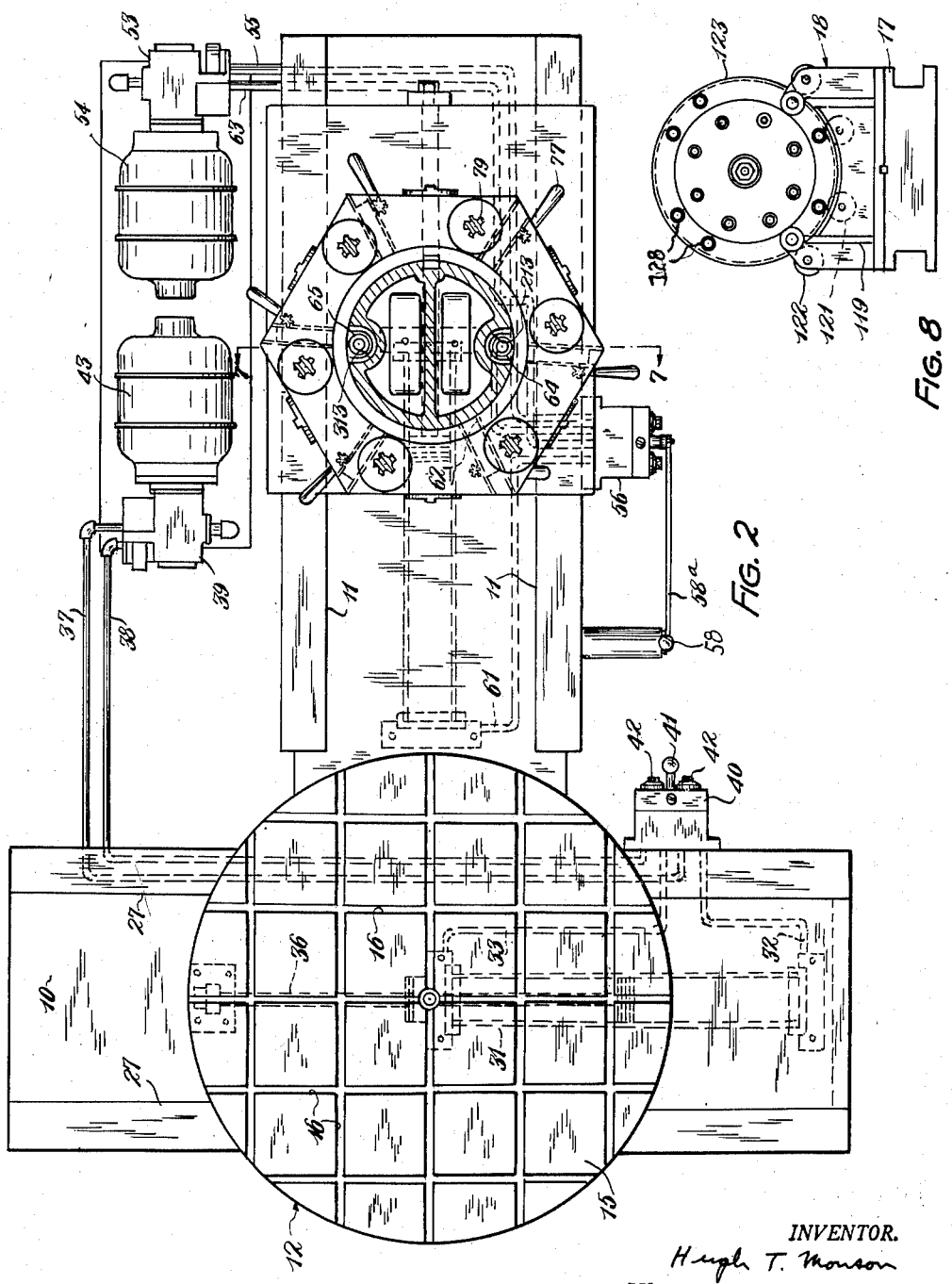

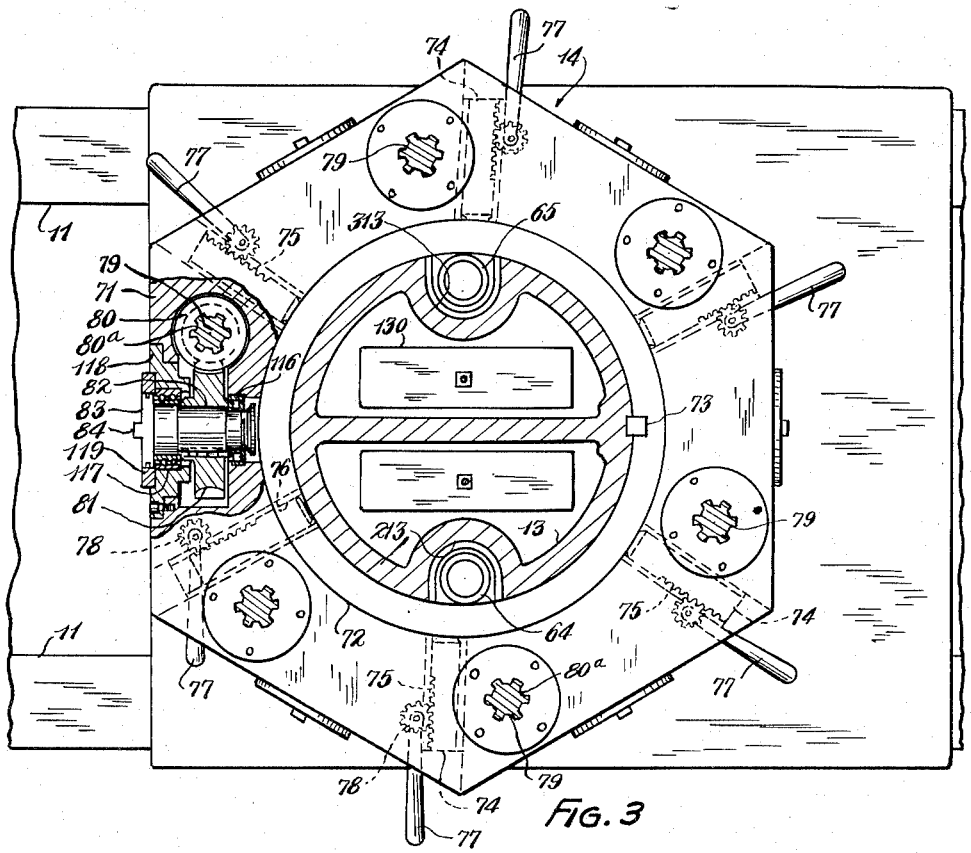
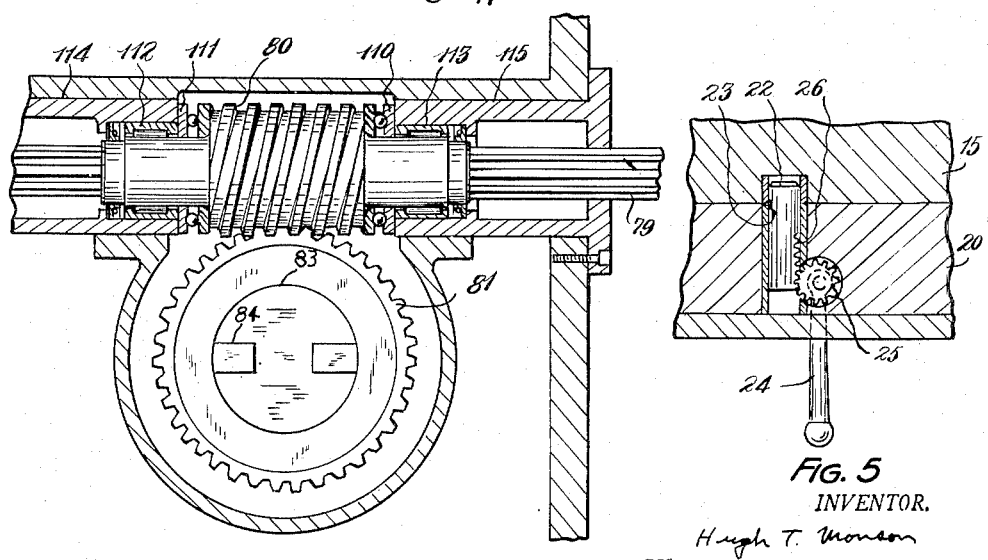
Fig. 4
Fig. 5
INVENTOR.
Hugh T. Monson
BY West & Oldham
ATTORNEYS

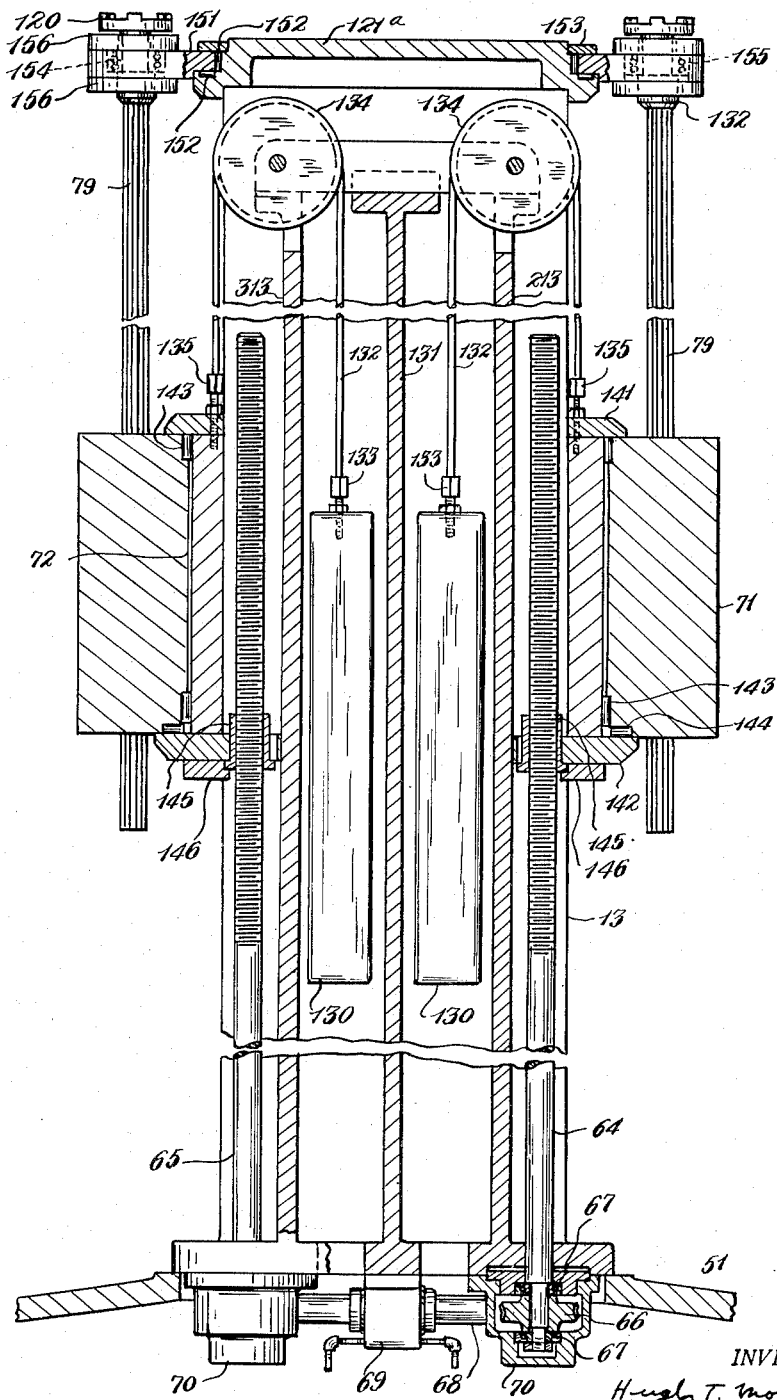

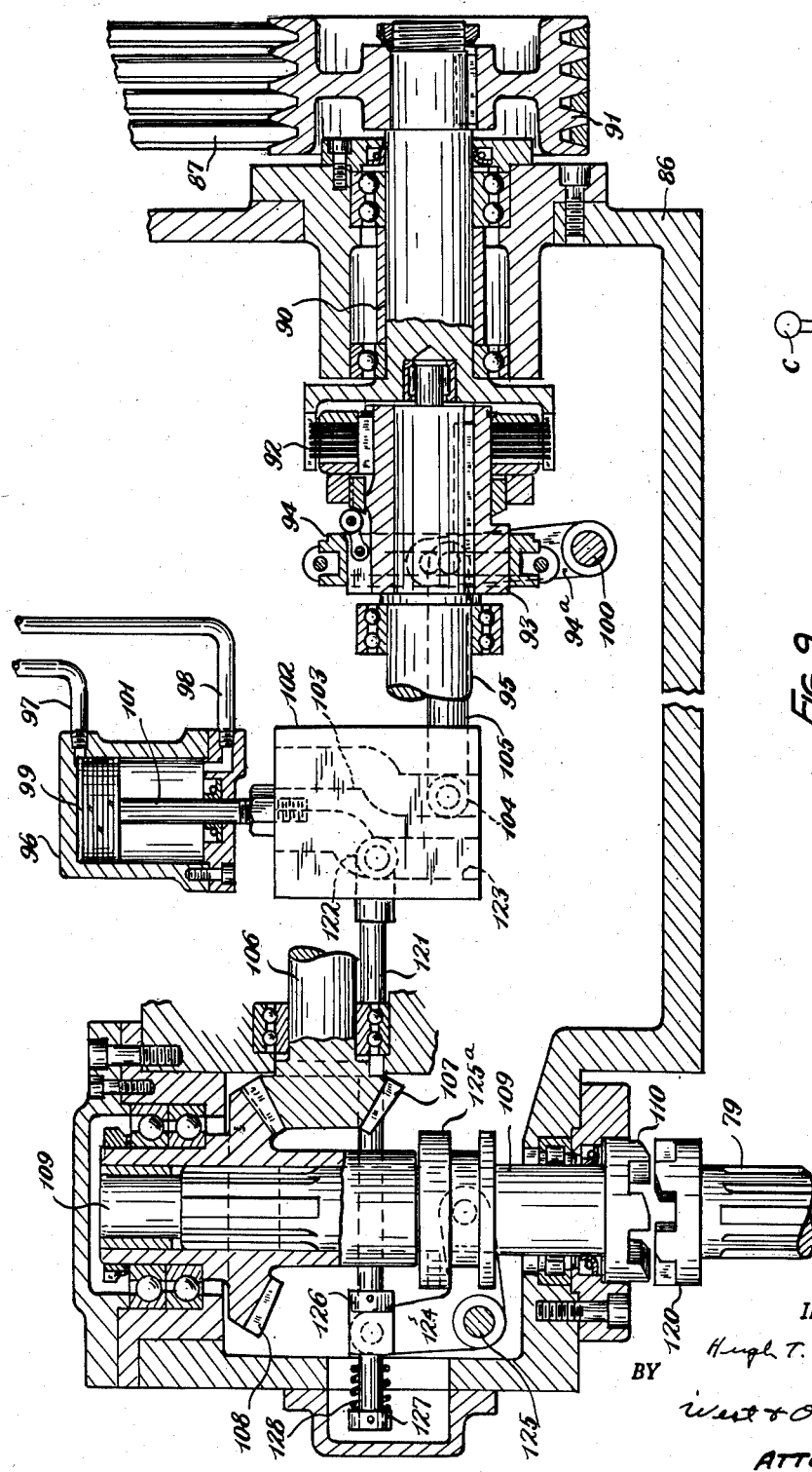

2,630,026

UNITED STATES PATENT OFFICE 2,630,026

TURRET TYPE BORING AND DRILLING MACHINE

Hugh T. Monson, Euclid, Ohio

Application August 6, 1947, Serial No. 766,549

6 Claims. (Cl. 77—23)

This invention relates to a turret type horizontal acting machine tool and especially to a vertical, turret type, universal boring and drilling machine having a plurality of individually selective and operative, horizontally positioned, tools associated with it.

Heretofore there have been a great many different types of machine tools provided with any of a large number of functions. However, many of the large, automatic machine tools, now available, are special machines and are adapted for use only on extremely large production runs wherein the tool will perform usually a plurality of actions simultaneously on a work piece. In other instances, there may be a plurality of machine tools associated with an assembly line with each different tool performing a separate operation on the work piece as it is associated with that particular tool. In still other instances and if the production of a particular piece is not of such number as to warrant setting up a line of machines each of which will perform only one operation on the work piece, then an individual machine may be used for the entire operation and it must be adjusted, reset, the work piece moved, or the machine tool be changed in other manners so as to perform a plurality of individual functions on the work piece at different times.

When working with large, heavy articles, such as truck axle housings, it is very difficult and cumbersome to move the work piece from machine to machine, or to adjust the work piece on a machine so as to machine it in a desired manner. Also, such stoppages between operations are both costly and production retarding.

All machine tools using a plurality of tools now known to me have the characteristic of either the work being movable with relation to the tool, or else the tool is movable with relation to the work and this makes it difficult in some instances to form the work piece in a convenient easy manner.

The general object of the invention is to avoid and overcome the foregoing and other disadvantages of present types of machine tools and to provide a machine tool which is characterized by its ability to perform a plurality of different operations on a work piece in a rapid, efficient manner.

Another object of the invention is to provide a single all-purpose machine tool adapted to perform a plurality of operations and have the production advantages of a battery of machines.

Another object of the invention is to provide a machine tool which can perform a variety of operations accurately, easily and rapidly.

Another object of the invention is to provide a turret type machine tool which is adapted to perform, individually, a number of different operations, either single or multiple, on a work piece.

A further object of the invention is to provide a machine tool wherein a plurality of tools are movable with relation to the work piece and the work piece is movable with relation to the tool elements.

Another object of the invention is to provide a machine tool especially adapted for performing a plurality of different operations upon a large or cumbersome work piece without any costly and time-consuming resetting operations on the machine or on the work piece.

A further object of the invention is to provide a turret-type machine tool for performing any of the following operations of drilling, reaming, tapping, boring, facing, milling, key slotting, peripheral milling, or jig boring without changing the tools on the machine.

A further object of the invention is to provide a vertical support column which has a multiple-head turret adjustably associated therewith for bringing any desired tool elements into engagement with the work piece associated with the machine.

Another object of the invention is to provide an improved jig for use in mounting a work piece for rotation about its horizontal axis.

Still other objects of the invention are to provide a machine tool that is especially adapted to multiple operations with the use of multiple heads for drilling, reaming and tapping; to drive tools carried by a turret through the turret; and to adjust a turret ring axially of its support without breaking the drive connection therefor.

The foregoing and other objects and advantages of the invention will be made apparent as the specification proceeds.

In the accompanying drawings,

Fig. 1 shows a side elevation of a turret type horizontal acting machine tool embodying the principles of the invention;

Fig. 2 is a plan view showing a horizontal section through the column of the machine of Fig. 1 on line 2—2 of Fig. 1, with the jig removed;

Fig. 3 is a fragmentary horizontal section of the turret and support column taken on line 3—3 of Fig. 1 with part of the turret being broken away to show the driving arrangement for an output spindle;

Fig. 4 is a fragmentary elevation, partly in section, of an output spindle and its driving arrangement;

Fig. 5 is a fragmentary vertical section taken on the line 5—5 of Fig. 1;

Fig. 6 is a fragmentary vertical section taken on line 6—6 of Fig. 1;

Fig. 7 is a fragmentary vertical section taken on the line 7—7 of Fig. 2;

Fig. 8 is an end view of the work support jig of the invention, with the index means removed;

Fig. 9 is a fragmentary sectional view of the clutch means of the invention; and Fig. 10 is a diagrammatic plan of a multiple turret machine tool modification of the invention.

The turret type universal machine tool of the invention generally comprises a frame, or base member 10, having column supporting ways 11 formed thereon and having a work support platen 12 carried by a second set of ways 27 formed at one end thereof. The base member 10 mounts a vertically extending tubular column, or support 13 on the ways 11 with the column 13 carrying a multi-head, annular turret 14 for adjustable vertical movement as well as for rotational movement with regard to the column 13. The column 13 is movable along the ways 11 while the platen 12 likewise can be moved along ways 27 that extend normal to the ways 11.

*Work support platen*

The work support platen 12 includes an annular plate 15 which has grooves 16 of substantially inverted T-shape in section formed thereon for engagement with the work piece, or a work support jig base 17 that in turn positons the work W for the machine tool of the invention. As a feature of the invention the jig 17 is provided with a pair of opposed work support cradles 18 which are adapted to support the work W for rotational movement about the horizontal axis 19, 19 of the work. The cradles 18 each include a roughly U-shaped elongate support bracket 119 secured to the jig base 17 at spaced portions thereof. The brackets 119 each journal a pair of support rolls 121 Fig. 8, intermediate the ends of the bracket, and have additional rolls 122 at their upper ends for positioning a flanged ring 123 for support by and rotation on all of such rolls 121 and 122 which are positioned on an arc of the ring 123. Fig. 1 shows that flanges 124 of the rings 123 are engaged with the axially outer surfaces of such rolls 121 and 122 so that the rings are held against axial inward movement thereby. The work piece, such as an axle housing, is engaged at its ends to the rings 123 by conventional means and a tie bar 125 extends through the housing, being secured at its ends to the ends of the housing, or to the rings 123, as desired. Thus the work piece is mounted for rotation about its longitudinal axis but is held against axial movement by the flanged rings 123. A lever 126 is pivotally carried by each of the brackets 119 for controlling, as hereinafter explained, a horizontally positioned index pin 127 slidably journaled in the bracket 119 so as to engage the index pin 127 with any of several recesses 128 formed in the ring 123 for receipt thereof. The pin 127 thereby can be used to lock the housing and rings 123 in position while work is performed on the work piece.

In addition to the adjustable positioning of the work piece by means of the cradle 18, the work support plate 15 is positioned by a vertically extending spindle 21, mounted on a plate 20 carried on ways 27, as shown in Fig. 1, about which the plate 15 can be rotated. Conventional roller bearing means supports the plate 15 and an indexing device, such as a pin 22, is positioned in the plate 20 for slidable vertical movement with relation thereto. This index pin 22 is adapted to engage with any of a plurality of circumferentially spaced recesses 23 formed in the bottom of the plate 15 so as to fix such work support plate in position with relation to the turret face. As shown in Fig. 5, a control lever 24, which is easily accessible from the outer part of the machine, carries a pinion 25 which is engaged with a rack 26 formed on the pin 22 whereby an arcuate movement of the control lever 24 can move the pin 22 into or out of engagement with an index recess so as to permit the plate 15 to be secured in a position or else to be moved arcuately to a different desired position with relation to the base frame 10.

A further movement of the work support platen 12 is also permitted on the ways 27 that extend transversely of the ways 11. This movement of the work support platen may be controlled by conventional means that may comprise a hydraulic cylinder 31 (Fig. 6) which has fluid supply lines 32 and 33 connected to the ends thereof, with a piston 34 being located in the cylinder 31. The cylinder 31 is suitably secured to the frame 10 while the piston 34 is connected to a dependent lug 35 formed on the undersurface of the plate 20 by a piston rod 36. Fluid under pressure is supplied to the lines 32 and 33 for controlling the position of the work support platen by means of lines 37 and 38 Fig. 2, which are connected to a hydraulic pump 39 whereby fluid under pressure can be supplied to a control box, or member 40 to which the lines 32 and 33 are connected. The control member 40 is of conventional construction and has suitable valves therein whereby flow of fluid to the cylinder 31 can be controlled by a lever 41 so as to effect movement of the work support platen in a desired direction. Adjustment dials 42 are provided on the control member 40 for regulating its action. The line 37, connected to the hydraulic pump 39, may be the fluid pressure line whereas the line 38 is the return line. Any suitable device, such as a motor 43, may drive the pump 39. Thus the platen 12 can be rotated on its vertical axis, or be moved along the ways 27, while a work piece mounted on the cradles 18 can be rotated on its horizontal axis to give complete adjustment in positioning the work on the platen 12.

*Vertical column*

The vertical column indicated generally at 13 has a base section 51 which is provided with at least one downwardly extending lug 52 extending therefrom. Conventional position control means, such as that used for controlling the position of the work support platen 12, are also provided for controlling the position of the vertical column assembly 13 on the base frame 10, since the vertical column assembly is movable along the longitudinal axis thereof. In this instance, a hydraulic pump 53, Fig. 2, is driven by a motor 54 and fluid under pressure flows from the pump through line 55 to a control 56. The control 56 has a control lever 57 associated with it, as in the control 40, and flow of fluid from the control 56 is regulated by a second lever 58 that is coupled to the lever 57 by a link 58ª. Fluid from the control 56 passes to a cylinder 59 to control the position of a piston 60 therein. The arrangement of the apparatus is such that when fluid flows into one end of the cylinder 59, it is exhausted from the other end of the cylinder and returns to the control 56 through one of the lines 61 and 62 connecting the control 56 to the cylinder 59 at opposite ends thereof. Fluid from the control 56 returns to the pump 53 through line 63 whereby the control 56 can be used to set the vertical column 13 at any desired position longitudinally of the base frame 10 and, usually, to feed the tools toward the work. The lever 58 is conveniently positioned for the operator of the machine for this purpose.

The column 13 has two vertically extending feed screws 64 and 65 associated with it in diametrically opposed vertically extending recesses 213 and 313 formed therein. These feed screws 64 and 65 are adapted to be driven in any desired manner and to this end each of the feed screws carries a worm wheel 66 at its lower end, as shown in Fig. 7. This worm wheel 66 in turn engages with a worm (not shown) that is secured to the drive shaft 68 of a conventional motor 69 positioned in the base part of the column. The motor 69 may be hydraulic and driven by any desired source of fluid power. As hereinafter explained, the vertically extending feed screws 64 and 65 are used to position the turret 14 in an adjustable vertical position on the column 13. Conventional bearings 67 journal the lower ends on the screws 64 and 65 in end caps 70 removably secured to the column 13.

Turret

The turret, indicated generally at 14, is provided with a plurality of circumferentially spaced operative stations, in this instance, six, whereby six different tools or groups of tools can be secured to the turret and, by adjusting the turret, the respective tools can be individually brought into engagement with the work W so as to perform any of the desired operations thereon. By adjustment of the position of the work through the work support platen 12 and control of the turret 14, a variety of operations can be rapidly and efficiently performed on the work W without removing it from the machine.

As best shown in Fig. 3, the turret 14 includes an annular frame member 71 which is carried by a sleeve 72 that is engaged with the column 13 and held against arcuate movement with relation thereto by a key 73 which permits vertical movement of the sleeve 72 on the column 13 but locks the two against undesired arcuate movement. The frame 71 is formed of substantially hollow construction so as to reduce the weight thereof. Any suitable index means are provided for each station of the turret and they may comprise a pin 74 having a rack 75 thereon for indexing in a hole or recess, such as the bushed recess 76 formed in the sleeve 72 so that the turret proper can be fixed in a given arcuate position with relation to the sleeve. A control lever 77 is carried by the turret at each station thereof and is provided with a pinion 78 that engages with the rack 75 for controlling the position of the index pin 74.

So as to effect drive of the individual turret stations, a plurality of vertically extending splined shafts 79, one for each turret station, are slidably received in and engaged with the turret 14. Each of the shafts 79 is adapted to be engaged with the splined bore 80ᵃ of a worm gear 80 which is journaled in housings 114 and 115 (see Fig. 4), that are inserted into the turret frame 71 from opposite sides thereof and removably secured thereto in a conventional manner. The gears 80 are journaled in the housings 114 and 115 by bearings 112 and 113 while bearings 110 and 111 abut against shoulders on the gears 80 and the inner ends of the housings to secure the gears 80 against vertical movement with relation to the turret. Each gear 80 is engaged with an associated worm gear 81 that is secured to a drive spindle for one of the turret stations. In Fig. 3 of the drawings, the gear 81 is shown mounted upon a stubby spindle 82 that is journaled in the turret frame 71 by bearing 116 and on a bearing 117 journaled in a bearing housing 118. The bearing housing 118 is bolted to the turret frame and held in place with a bearing cap and adaptor plate 119. A drive plate 83, having diametrically opposed lugs 84 thereon, is integral with the spindle 82 and extends outwardly of the frame 71 in such a manner that any desired single or multiple tool can be secured to the turret frame and be driven through the spindle 82, which is driven by its associated shaft 79. Fig. 3 shows that the spindles 82 extend radially of the turret.

While the drive for the vertically extending splined shafts 79 may be provided from any conventional source, in this instance, a motor 85 (Fig. 1) is carried on a gear box 86 which in turn is secured to a plate 121ᵃ, Fig. 7, that is secured to the upper end of the column 13. The drive from the motor 85 may be transmitted to the gear box 86 through a plurality of flexible belts 87.

Reference now is made to Fig. 9 of the drawing which best shows the details of the clutch means for the machine tool of the invention. In this instance, a stub shaft 90 is provided to mount a pulley 91 with which the V-belts 87 are engaged.

A friction clutch 92 is provided to connect a sleeve 93 to the shaft 90 and an annular ring 94 is engaged with the sleeve member 93 which in turn is mounted on a shaft 95. A control cylinder 96 is provided in the gear box 86 for regulating the operation of a yoke 94ᵃ, engaged with ring 94, and has a suitable source of pressure fluid through lines 97 and 98 so that the position of a piston 99 in the cylinder 96 can easily be controlled. To control the clutch 92, a piston rod 101 extends from the cylinder 96 and carries a guide block 102 thereon. The guide block 102 has a slotted recess 103 therein which engages with a roller 104, journaled on a rod 105 that is associated with the yoke 94ᵃ, which connects to the ring 94, so as to control the position of the ring 94 axially with relation to the sleeve 93 so as to control the engagement of the friction clutch 92. The yoke 94ᵃ is pivotally positioned on a shaft 100 suitably secured in the gear box. Any suitable conventional gear train is coupled to the shaft 95 and connects to an output shaft 106 that has a beveled drive gear 107 secured thereto. This output drive gear 107 is meshed with a corresponding gear 108 having a splined bore that telescopically receives a splined drive shaft 109 which carries one half of a jaw clutch 110 at the lower end thereof. The drive shaft 109 is received in the gear box for limited axial movement so that it can be moved to and from engagement with one of the mating jaws 120 or clutch section, secured to the upper end of each one of the drive shafts 79 of the machine.

The axial position of the drive shaft 109 is controlled through the guide block 102 by means of a thrust rod 121 which carries a roller member 122 at one end thereof that engages with a slotted recess 123 in the guide block. Note that the recesses 123 and 103 in the guide block 102 are of corresponding shape but that axial displacement of the rods 105 and 121 occurs at diverse portions of movement of the piston 99 so that the clutch element 110 can be brought into engagement with its associated clutch section prior to engagement of the friction clutch 92. Thus, if necessary, the clutch sections 110 and 120 may have slight relative movement to bring them into proper engagement before load is transmitted through such clutch sections by engagement of clutch 92. Specifically, thrust rod 121 engages one end of a bell crank 124 that is pivotally secured to the gear box 86 by pin 125. The other end of the bell crank 124 is engaged with a yoke 125a secured to the shaft 109. In disengaging the clutches, the friction clutch 92 will be first released to remove power from the clutch sections 110 and 120 prior to their disengagement. Action of the cylinder 96 can be controlled in any desired manner. The bell crank 124 engages with the thrust rod 121 by means of a member 126 which is secured to the rod and has an open end section extending toward a flanged head 127 of the rod. A coil spring 128 is compressed between the flanged head 127 of the rod and the arm of the bell crank 124 so as to retain the arm in engagement with the bell crank but permit the spring 128 to absorb initial movement of the thrust rod should the clutch section 110 be improperly positioned for engagement with the clutch section 120 until rotation of the shaft 109 starts. Thus, as the turret 14 is indexed in a desired position with relation to the vertical column 13, the clutch section 120 on the proper vertically directed drive shaft 79 can be engaged with the clutch section 110 whereby the desired turret station output shaft will be driven from the motor 85.

So as to facilitate control of the vertical position of the turret assembly 14 on the vertical column 13, a pair of counterweights 130, Fig. 7, are positioned within the hollow center of the column assembly 13 which is divided into diametric sections by a partition 131. These counterweights 130, received in invidual sections of the column, are secured to support cables 132 by a connecting member 133 and the cables each extend over a sheave 134 which is journaled on the upper part of the column 13. The cables 132 extend down to and are secured to diametrically opposed portions of the sleeve 72 by means of connector members 135. Hence when the turret is to be raised or lowered, complementary movement will be made by the counterweights 130 so as to reduce the work required to adjust the turret to a desired vertical position.

Fig. 7 shows that the turret assembly 14 may have a top annular plate 141 and a bottom annular plate 142 that removably secure the turret frame 71 to the sleeve 72. Vertically extending bearings 143 separate the frame 71 and sleeve 72 while horizontal thrust bearings 144 aid in rotatably positioning the frame 71 on its support plate 142. The vertical feed screws 64 and 65 engage with nuts 145 that are fixedly secured to the bottom plate 142 by removable clamps 146 so that rotation of the feed screws occasions vertical movement of the turret since the nuts 145 are immovable with relation thereto.

To aid in positioning the drive shafts 79, an annular plate 151 is journaled on the edge of the plate 121a by bearings 152 and secured in position by a clamp ring 153. The upper end of each shaft 79 fixedly carries a collar 154 which is journaled in the plate 151 with the shaft end protruding from the plate to mount one of the clutch sections 120. A bearing 155 journals each of the collars 154 in the plate 151 and positions the shafts against vertical movement. Clamp disks 156 may be removably secured to the plate 151 to retain the collars 154 and bearings 155 in position.

It will be seen that any desired tooling can be removably attached to the different stations of the turret 14 whereby one or more desired operations can readily be performed on a work piece associated with the machine of the invention. As indicated above, these tools may perform drilling, reaming and tapping operations, or various face milling, radius milling, gang milling, etc.; or boring and facing operations could be performed, while in some instances combinations of the above operations may be performed by the machine.

Still another possibility in the operation of the machine, as indicated diagrammatically in Fig. 10, is to provide a plurality of columns C similar to the column 13 which would be centered about the work support platen P whereby several operations could be simultaneously performed on a work piece and whereby the number of different operations which could be performed on a work piece while retained in engagement with the machine would be doubled, trebled or quadrupled, depending upon whether one, two or three or more columns would be added to the machine. The multi-column machine would speed completion of the operations required to finish a given article. Of course, in all embodiments of the invention any desired tools may be temporarily or permanently associated with a turret face although a tool is shown secured to but one face or station of the turret disclosed herein.

Automatic cycling controls of any desired type may be provided for the machine, as may other conventional feed controls or means, and likewise different jigs from that disclosed, or no jig, or a series of indexing jigs can be used, if desired. The turret is usually rotated manually when its operative station is changed but its position may also be automatically or mechanically controlled. In some instances, a separate control panel may be provided for the machine and all of the controls would be mounted thereon. As a further possible modification of the machine disclosed, it also may even be desirable to position the support column for the turret ring horizontally and move such ring horizontally for rotation in a vertical plane. The index device on the jig 17 is of the same construction as the index device of Fig. 5.

From the foregoing, it will be seen that a novel machine tool having very flexible and desirable operating characteristics is provided by the invention. The adjustability of the tools with relation to the work, the plurality of operations that can be selectively performed, and the special drive provided for the tools produce improved machine operation so that the objects of the invention are achieved.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. In a horizontal acting machine, a vertically extending column having a pair of vertically extending diametrically opposed recesses therein, a sleeve carried by said column for vertical movement with relation thereto, a turret ring having a plurality of circumferentially spaced stations associated with said sleeve, a pair of annular plates secured to the upper and lower ends of said sleeve and projecting radially therefrom to engage with said turret ring, bearing means associated with said plates and said turret ring for positioning said turret ring rotatably on said sleeve and said lower plate, index means carried by said turret ring and adapted to engage with said sleeve for locking said turret ring against arcuate movement on said sleeve, a vertically extending feed screw positioned in each of the recesses in said column, means for driving said feed screws, and means engaging said feed screws with said turret ring whereby rotation of said feed screws moves said turret ring vertically of said column.

2. In a machine tool, a vertically extending column, a turret ring having a plurality of circumferentially spaced stations associated with said column, said turret ring including a sleeve engaging said column, a pair of plates associated with the upper and lower ends of said turret ring, bearing means associated with said plates and said turret ring for positioning said turret ring rotatably on said plates, index means carried by said turret ring and adapted to engage with said sleeve for locking said turret ring against arcuate movement thereon, a pair of diametrically opposed vertically extending feed screws positioned adjacent said column, means for driving said feed screws, and means engaging said feed screws with said lower plate whereby rotation of said feed screws moves said turret ring vertically of said column.

3. In a multiple head horizontally acting machine, a vertically extending support member, a turret ring carried by said support member for mounting a plurality of different operative means at spaced circumferential stations thereof, a separate drive shaft for each of said stations of said turret ring engaged permanently with said ring and extending parallel to said support member, said turret ring being movable longitudinally of said drive shafts and being rotatable with relation to said support member, a plurality of drive spindles journaled in said turret ring, means permanently connecting each one of said drive shafts to a different one of said drive spindles, an annular plate journaled on said support member for rotation in a plane parallel to the plane of rotation of said turret ring, means journaling and supporting one end of each of said drive shafts in said annular plate, a clutch element carried by each of said drive shafts at one end thereof, and a driven clutch element adapted to engage with one of said clutch elements on said drive shafts to drive same whereby the assembly of said turret ring and associated apparatus can be rotated about said support member to position a desired drive shaft for engagement with said driven clutch element.

4. In a machine tool, a vertically extending column, a turret ring having a plurality of circumferentially spaced stations associated with said column, said turret ring including a sleeve engaging said column, a plate associated with the lower end of said turret ring, bearing means associated with said plate and said turret ring for positioning said turret ring rotatably on said plate, index means carried by said turret ring and adapted to engage with said sleeve for locking said turret ring against arcuate movement thereon, vertically extending feed screws positioned adjacent said column, means for driving said feed screws, and means engaging said feed screws with said plate whereby rotation of said feed screws moves said turret ring vertically of said column.

5. In a machine tool, a vertically extending column, a turret ring having a plurality of circumferentially spaced stations associated with said column, said turret ring including a sleeve non-rotatably engaging said column, a pair of plates associated with the upper and lower ends of said turret ring, bearing means associated with said plates and said turret ring for positioning said turret ring rotatably on said plates, index means carried by said turret ring and adapted to engage with said sleeve for locking said turret ring against arcuate movement thereon, a pair of diametrically opposed vertically extending feed screws positioned adjacent said column, means for driving said feed screws, and means engaging said feed screws with said lower plate whereby rotation of said feed screws moves said turret ring vertically of said column.

6. In a machine tool, a vertically extending column, a sleeve member carried by said column for vertical movement therealong but being held against rotation with relation to said column, a turret ring rotatably carried by said sleeve, means for moving said turret ring vertically of said column, said turret ring having a plurality of circumferentially spaced operative stations, a splined drive shaft for each of said stations of said turret ring, said splined drive shafts extending parallel to said column and being continually engaged with said turret ring in passing therethrough, means for continually engaging said splined drive shaft and transmitting drive therefrom to said turret ring, means for retaining said splined drive shaft in a fixed vertical position and including a journal plate rotatably engaged with said column, one end portion of each of said splined drive shafts being engaged with said journal plate, vertically movable clutch means fixedly positioned on a top portion of said column for individually engaging with the selected drive shaft, and other clutch means connecting to said first named clutch means for coupling same to a desired drive means.

HUGH T. MONSON.

REFERENCES CITED

The following references are of record in the file of this patent:

UNITED STATES PATENTS

| Number | Name | Date |
|---|---|---|
| 295,524 | Clough | Mar. 25, 1884 |
| 504,289 | Vanderbeek et al. | Aug. 29, 1893 |
| 809,594 | Widmer-Abegg | Jan. 9, 1906 |
| 946,989 | Steinle | Jan. 18, 1910 |
| 1,104,517 | Landon | July 21, 1914 |
| 1,242,775 | Curtis | Oct. 9, 1917 |
| 1,274,859 | Daniels | Aug. 6, 1918 |
| 1,338,742 | Lofton | May 4, 1920 |
| 1,389,216 | Potter | Aug. 30, 1921 |
| 1,958,990 | Carlson | Aug. 7, 1934 |
| 1,967,683 | Ostrander | July 24, 1934 |
| 2,020,040 | Rauen | Nov. 5, 1935 |
| 2,094,816 | Poppensieker | Oct. 5, 1937 |
| 2,192,436 | Groene et al. | Mar. 5, 1940 |
| 2,227,582 | Hillman et al. | Jan. 7, 1941 |
| 2,320,079 | Hartwig | May 25, 1943 |
| 2,348,364 | Ruppel | May 9, 1944 |
| 2,386,925 | Beck et al. | Oct. 16, 1945 |
| 2,393,696 | Kraut et al. | Jan. 29, 1946 |
| 2,447,058 | Dence | Aug. 17, 1948 |
| 2,557,228 | King et al. | June 19, 1951 |

FOREIGN PATENTS

| Number | Country | Date |
|---|---|---|
| 140,270 | Great Britain | Mar. 25, 1920 |
| 396,131 | Great Britain | Aug. 3, 1933 |